(12) United States Patent
Roach

(10) Patent No.: US 6,176,405 B1
(45) Date of Patent: Jan. 23, 2001

(54) FOOD AND BEVERAGE CONTAINER HOLDER DEVICE FOR MOTORCYCLES

(76) Inventor: Michael V. Roach, 1206 Park Dr., Wilmington, IL (US) 60481

( * ) Notice: Under 35 U.S.C. 154(b), the term of this patent shall be extended for 0 days.

(21) Appl. No.: 09/303,533

(22) Filed: Apr. 30, 1999

(51) Int. Cl.[7] .................................................. B62J 11/00
(52) U.S. Cl. ........................ 224/414; 224/413; 224/444; 224/549; 224/926; 248/311.2
(58) Field of Search ..................... 224/412, 413, 224/414, 428, 431, 432, 433, 441, 447, 451, 459, 463, 926, 444, 549; 248/311.2; 62/457.4, 457.5

(56) References Cited

U.S. PATENT DOCUMENTS

| | | | |
|---|---|---|---|
| 3,840,204 | * | 10/1974 | Thomas et al. .................... 248/311.2 |
| 4,059,207 | * | 11/1977 | Jackson et al. ....................... 224/413 |
| 4,191,350 | * | 3/1980 | Ormond ......................... 248/311.2 X |
| 4,359,233 | * | 11/1982 | Jackson et al. ....................... 224/413 |
| 4,469,256 | * | 9/1984 | McEwen ............................... 224/413 |
| 4,583,707 | * | 4/1986 | Anderson ....................... 248/311.2 X |
| 4,974,765 | * | 12/1990 | Marchetto et al. .............. 224/413 X |
| 5,042,770 | * | 8/1991 | Louthan ............................ 248/311.2 |
| 5,152,489 | * | 10/1992 | Christensen et al. ............. 248/311.2 |
| 5,170,981 | * | 12/1992 | Lin ................................... 224/414 X |
| 5,219,140 | * | 6/1993 | Spykerman ....................... 248/311.2 |
| 5,558,306 | * | 9/1996 | Binford et al. ............... 248/311.2 X |
| 5,704,525 | * | 1/1998 | Barro .................................... 224/414 |
| 5,924,303 | * | 7/1999 | Hodosh .............................. 62/457.4 |
| 5,997,082 | * | 12/1999 | Vincent et al. ............... 248/311.2 X |

* cited by examiner

Primary Examiner—Gregory M. Vidovich
(74) Attorney, Agent, or Firm—Cherskov & Flaynik

(57) ABSTRACT

A food and beverage container holder device 10 that sets upon a tank portion of a motorcycle at a position where the rider can comfortably reach the container, includes a receiving member 12 that removably receives the container, a positioning member 14 that adjusts the receiving member 12 so as to maintain the container in a substantially vertical position, a stabilizing member 16 that "locks-in" the substantially vertical position of the container, and a securing member 18 that provides sufficient securing force to secure the device 10 and the received container therein, and that allows substantially the entire device 10 to be removably secured to the motorcycle.

13 Claims, 8 Drawing Sheets

FOOD AND BEVERAGE CONTAINER HOLDER DEVICE FOR MOTORCYCLES

BACKGROUND OF THE INVENTION

1. Field of the Invention

The present invention relates generally to beverage container holders and, more particularly, to devices that are removably secured to a tank portion of a motorcycle, and that removably receive food and beverage containers therein.

2. Background of the Prior Art

Many types of storage devices are available for attachment to motorcycles. These include containers designed for storing items for long periods of time. Other container types are basically a holder with straps for items that won't spill. Still other holding device designs are for mounting to stationary exercise bikes. Examples of these and other prior art storage and/or holder devices are disclosed in U.S. Pat. Nos. 3,926,274; 3,938,719; 3,944,009; 4,059,207; 4,260,085; 4,469,256; 4,750,658; 4,974,765; 5,190,376; 5,423,509; 5,664,718; and German Patent 555,689. None provide a device that is removably secured to a motorcycle, and capable of removably receiving a container therein while the motorcycle is moving. A need is present for a device that allows an individual to drink from a container, then safely return the container to a holder removably secured to a moving motorcycle, until the individual again retrieves the container.

SUMMARY OF THE INVENTION

It is an object of the present invention to provide a holding device for removably receiving a container therein while a motorcycle is moving.

A principle object of the present invention is to provide a device that holds a container and allows an individual to remove and/or replace the container while operating a motorcycle. A feature of the device is an elevated container receiving member that snugly receives a beverage or food container. An advantage of the device is a secured upper portion of the container.

Another object of the invention is to stabilize a lower portion of the received container. A feature of the device is a rubber wrap member engaging a lower portion of the container. An advantage of the device is that the container is maintained in a substantially vertical position.

Yet another object of the invention is to provide a biasing force that "locks-in" the position of the container when set upon a portion of the wrap member. A feature of the device is the joining of a stretch member to the wrap member and a securing member. An advantage of the device is that the container contents will not spill when the motorcycle is moving.

Still another object of the invention is to provide a device that is removably secured to a fuel tank portion of a motorcycle. A feature of the device is a securing member having a first portion permanently secured to the receiving member, a second portion permanently secured to the tank portion, and the first and second portions being removably secured together. An advantage of the device is that substantially the entire device is detachable from the motorcycle.

Another object of the invention is to provide a device that is foldable. A feature of the device is a positioning member pivotably secured to the container receiving member. An advantage of the device is that by pivoting the positioning member to a position adjacent to the container receiving member, the device is effectively "flattened" thereby removing any hindrance the device may cause if left in an expanded, container receiving position.

Still another object of the present invention is to prevent damage to the fuel tank portion of the motorcycle receiving the device. A feature of the device is a "stick-on" velcro portion of the securing member that attaches to the surface of the fuel tank. An advantage of the device is that the device is secured to the fuel tank without the use of components capable of scratching the surface of the tank.

Briefly, the invention provides a food and beverage container holder device for motorcycles comprising means for removably receiving a container when the motorcycle is moving; means for removably securing said holder device to a motorcycle; means for positioning said holder upon an inclined surface; and means for stabilizing said holder device and the received container when said holder is removably secured to the motorcycle.

BRIEF DESCRIPTION OF THE DRAWINGS

The foregoing invention and its advantages may be readily appreciated from the following detailed description of the preferred embodiment, when read in conjunction with the accompanying drawings in which.

DETAILED DESCRIPTION OF THE PREFERRED EMBODIMENT

Figure 1:
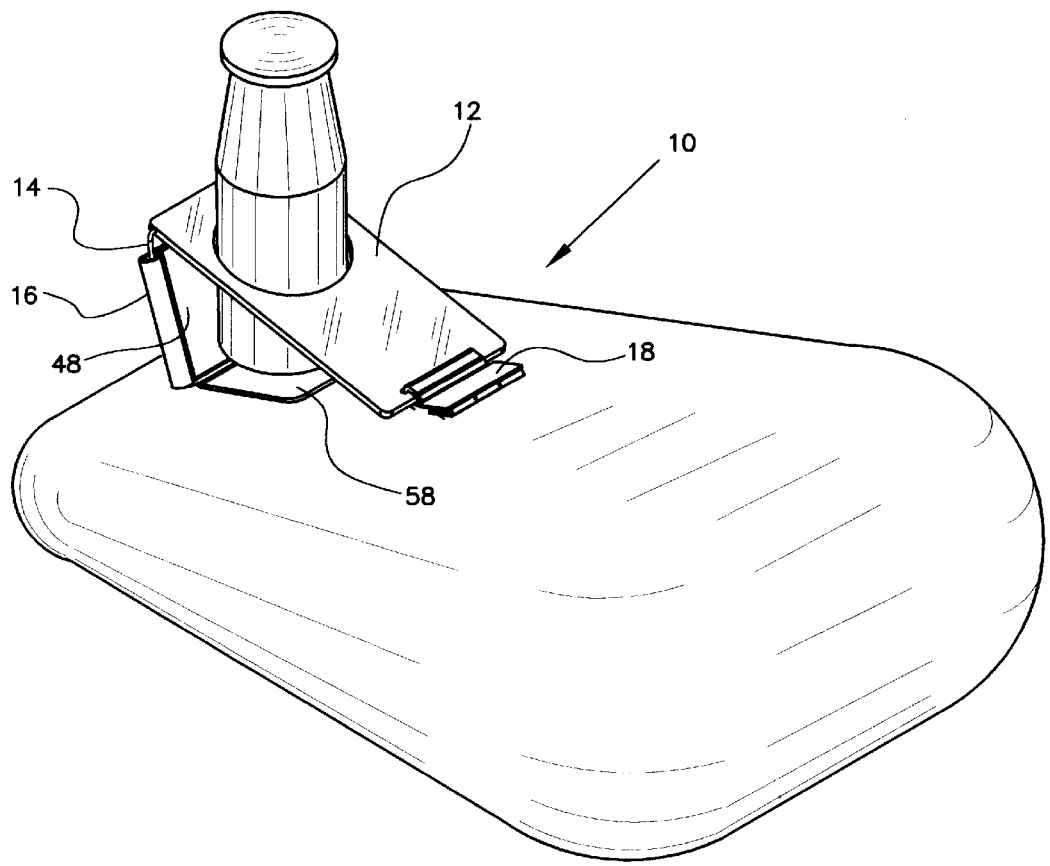
FIG. 1 is a perspective view of a food and beverage container holder device positioned upon a motorcycle gas tank in accordance with the present invention.

Referring now to the figures and in particular to FIG. 1, a perspective view of a food and beverage container holder device in accordance with the present invention is denoted by numeral 10. The device is depicted being secured to a fuel tank portion of a motorcycle, and holding a container capable of storing a myriad of items including food and beverages. The fuel tank portion of the motorcycle is not part of the invention, nor is the container inserted therein.

Figure 2:
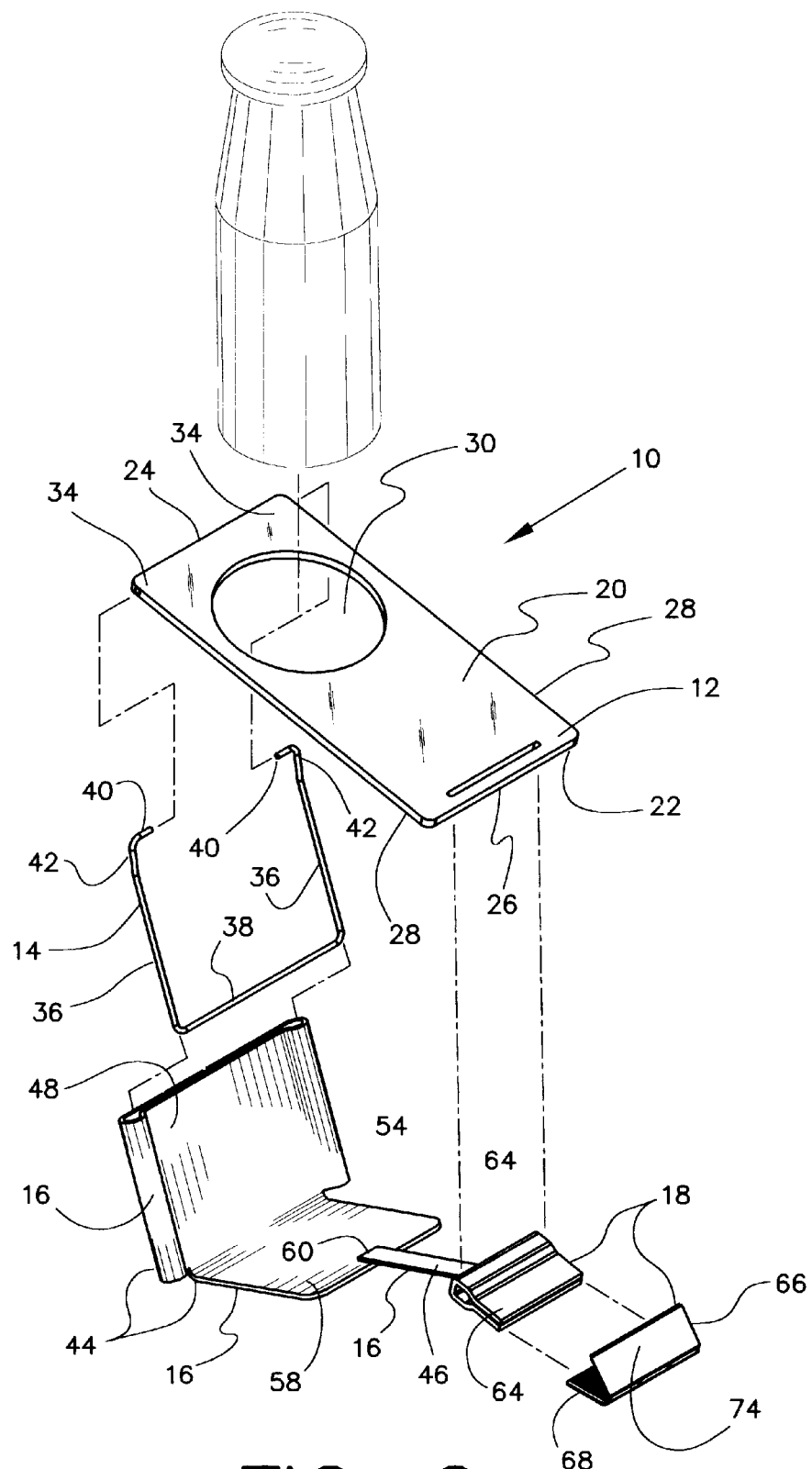
FIG. 2 is an exploded perspective view of the device with a container adjacently positioned above in accordance with the present invention.
Figure 3:
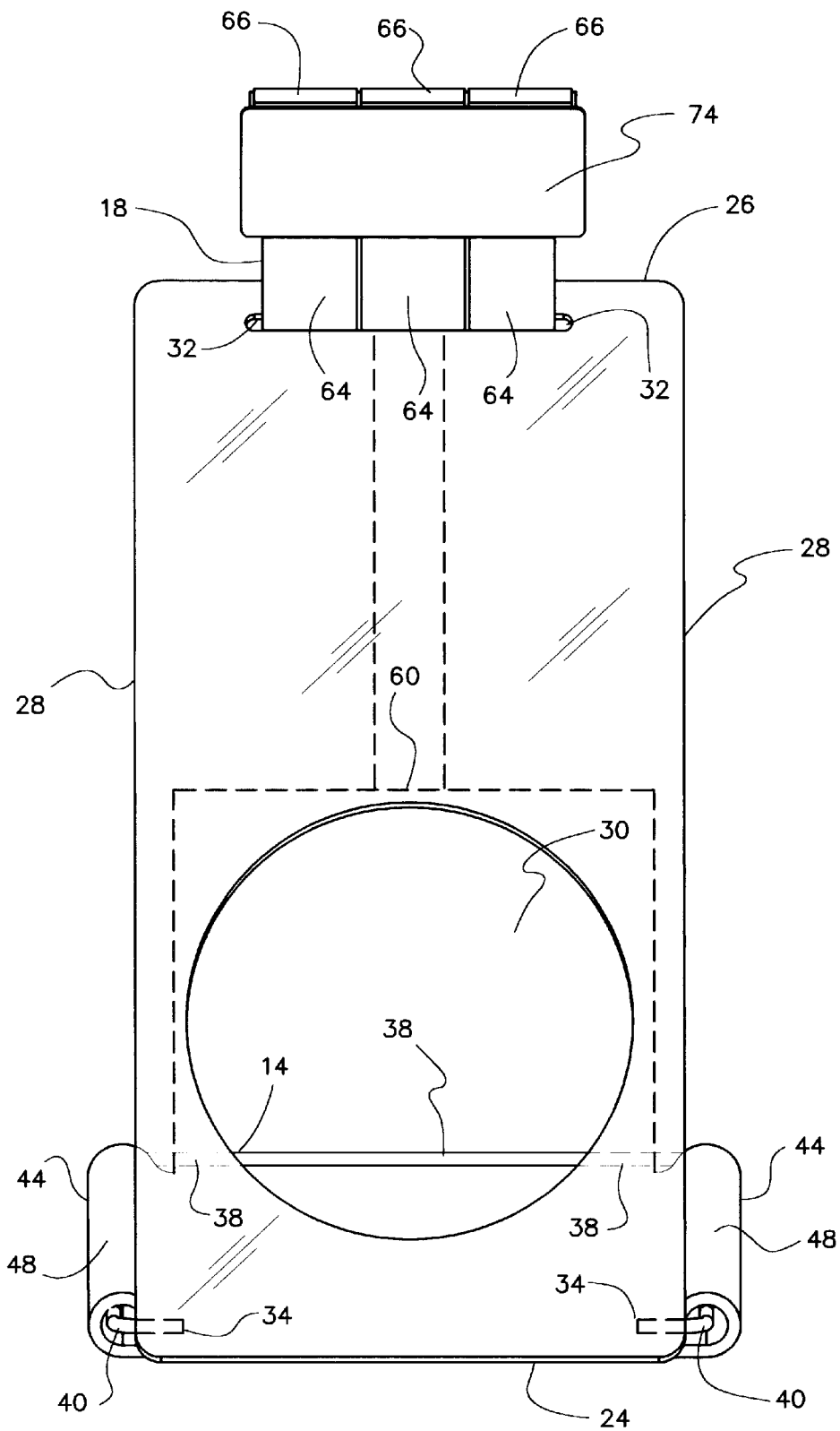
FIG. 3 is a top elevation view of the device with lower portions of the device visible through a transparent receiving member.
Figure 4:
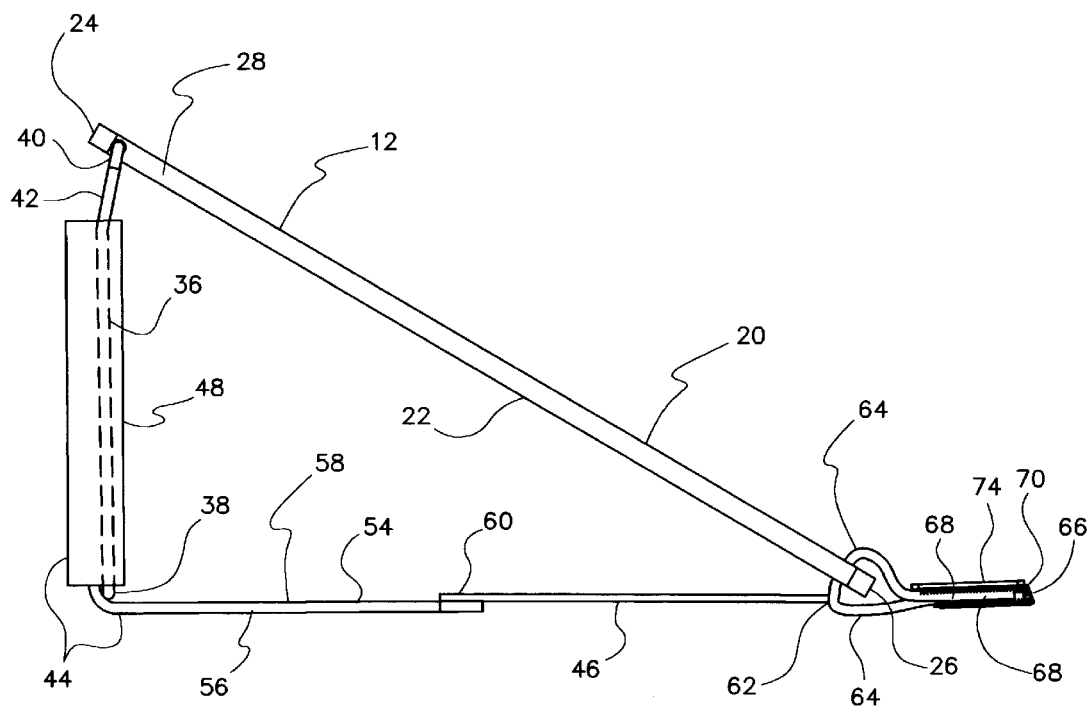
FIG. 4 is a side elevation view of the device positioned to receive a container therein. A phantom view of a portion of a positioning member is seen through a portion of a wrap member.
Figure 5:
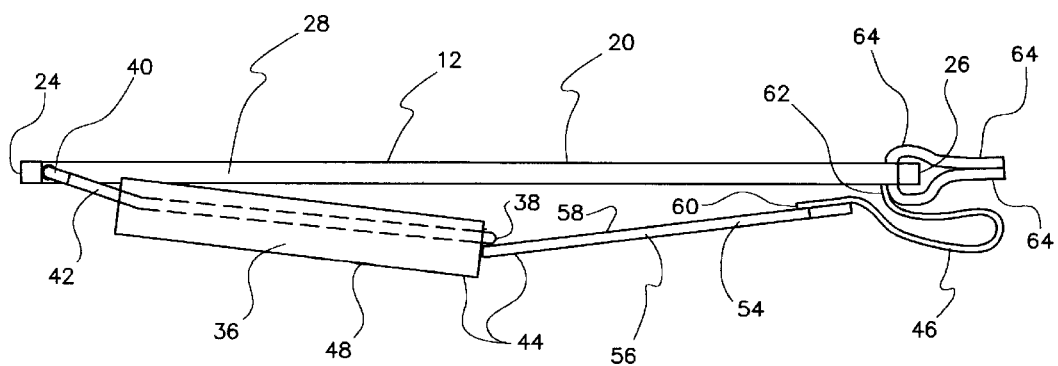
FIG. 5 is a side elevation view of the device of FIG. 4 but in a collapsed or folded position.

Referring to FIG. 2, an exploded perspective view of the device 10 in accordance with the present invention with a container adjacently positioned above, is depicted. The device 10 includes a container receiving member 12, a positioning member 14, a stabilizing member 16 and a securing member 18. The device 10 is designed to allow an individual riding the moving motorcycle, to lift a container from the device, drink or eat the contents in the container, then place the container back in the holder such that the contents of the container will not spill.

Referring to FIG. 1–5, the container receiving member 12 is fabricated from a rigid, non-deformable, transparent piece of plastic having a substantially rectangular configuration, when taking a top view of the receiving member 12, that is relatively smaller than and similar in configuration to the tank portion of the motorcycle that the device 10 sets upon. The receiving member 12 includes parallel top and bottom planar walls 20 and 22 separated a relatively short distance thereby forming relatively "thin" first and second lateral side walls 24 and 26, and opposing longitudinal side walls 28. The receiving member 12 further includes a container receiving aperture 30 positioned adjacent to the first lateral side wall 24, a securing aperture 32 positioned adjacent to the second lateral side wall 26, and a pair of opposing positioning recesses 34 located adjacent to the first lateral side wall 24 in the opposing longitudinal side walls 28. The apertures 30 and 32 are cut through the top and bottom walls 20 and 22 while the recesses 34 are drilled a relatively short distance into the longitudinal side walls 28. The recesses 34 are axially aligned and separated a short distance from and parallel with the first lateral side wall 24 of the container receiving member 12.

The container receiving aperture 30 generally has a cylindrical configuration dimensioned to snugly receive a beverage container or can; however, the configuration and size of the aperture 30 may vary to conform to the container ultimately inserted therein. The securing aperture 32 is substantially a "narrow" slot having a small lateral dimension in relation to a relatively larger longitudinal dimension that is parallel to the second side wall 26 of the receiving member 12. The securing aperture 32 is equally spaced between the longitudinal side walls 28 of the receiving member 12, and relatively close to the second side wall 26.

The positioning member 14 includes a relatively rigid piece of wire or metal bar having a substantially square configuration forming two side members, 36, a base member 38 and one open side resulting in two opposing end portions 40 that are slightly skewed from the plane containing the side and base members 36 and 38 due to offset portions 42 integrally joined to the side members 36 and the end portions 40. The offset portions 42 allow the side members 36 to be positioned substantially vertical when horizontally positioning the receiving member 12 upon an inclined motorcycle tank. The more vertical the side members 36, the more stable the device 10 and the container therein. The two opposing end portions 40 extend convergingly to a distance of separation relatively shorter than the distance separating the longitudinal side walls 28 of the receiving member 12. The end portions 40 are axially aligned and dimensioned to snugly insert into the opposing recesses 34 of the receiving member 12, a distance substantially equal to the longitudinal dimension of the recesses 34, and determined empirically to provide stability to the device 10 based upon a received container having a predetermined height, cross-sectional area and mass. The above container parameters also determine the diameter and the relative lengths of the side members 36 and base member 38. For example, a typical twelve ounce soft drink can requires the length of the side members 36 and the base member 38 to be slightly less than the height of the cylindrical can.

Figure 6:
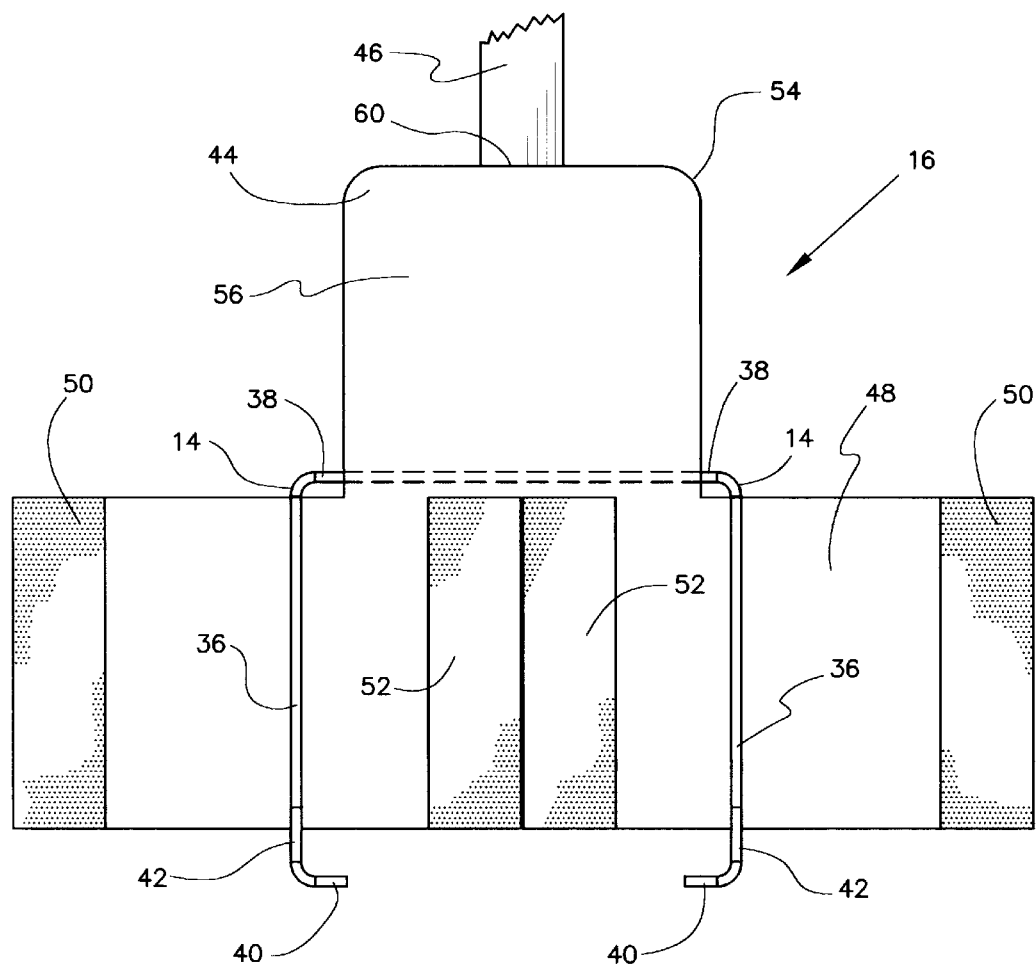
FIG. 6 is a top elevation view of a wrap member of the device with a positioning member placed thereupon. The figure includes a phantom view of a portion of the positioning member extending beneath the wrap member.
Figure 7:
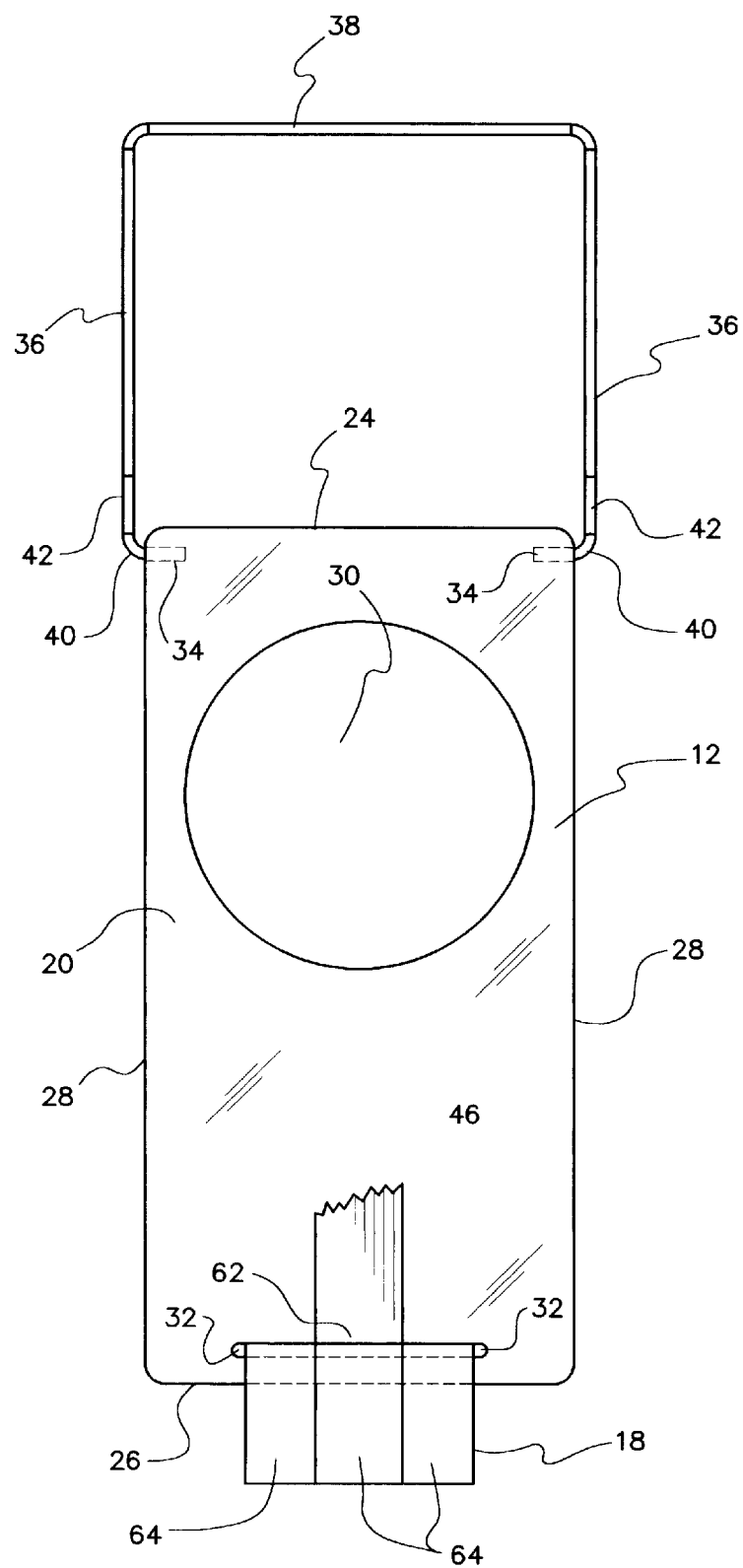
FIG. 7 is a bottom elevation view of the receiving member joined to and coplanar with the positioning member.

Referring to FIGS. 2, 6 and 7, the stabilizing member 16 includes a substantially "T" configured, pliable, wrap member 44 fabricated from a single piece of neoprene rubber, and a resilient stretch member 46 integrally joined to the wrap member 44 and the securing member 18. The first portion 48 of the wrap member 44 removably secures the wrap member 44 to the positioning member 14 via "bristly" or "hook" VELCRO® strips 50 secured to opposing ends of the first member 44. The strips 50 are wrapped around the side members 36 of the positioning member 14 and attached to "felt" or "loop" VELCRO® strips 52 secured to a middle portion of the wrap member 44.

The wrap member 44 further includes a second portion 54 that is "bent" around the base member 38 of the positioning member 14 until forming an obtuse angle with the first portion 48. When the device 10 is set upon the tank portion of the motorcycle, a lower surface 56 of the second portion 54 "grips" the engaged surface of the tank, and an upper surface 58 of the second portion 54 "grips" the engaged bottom portion of the container thereby stabilizing the relative position of the container and the container holder device 10 in relation to the motorcycle.

The stretch member 46 is fabricated from a strip of elastic or other deformable yet resilient material capable of withstanding the stresses generated by a motorcycle operating upon a rough road surface. The stretch member 46 includes a first end 60 integrally joined to an edge portion of the upper surface 58 of the second portion 54 of the wrap member 44, and a second end 62 generally joined to a first securing portion 64 of the securing member 18. The stretch member 46 provides a bias to the wrap member 44 when a lower portion of a container, inserted through the aperture 30, forces the first portion 48 of the wrap member 44 engaging the positioning member 14, to pivot oppositely to the second side wall 26 of the container member 12 thus elongating the stretch member 46 and urging the first member 48 into forcible engagement with a lower portion of the container and correspondingly urging an upper portion of the container into forcible engagement with the receiving member 12 at the aperture 30 to stabilize or "lock-in" the relative position of the container once set upon the second portion 54 of the wrap member 44.

The securing member 18 includes the first securing portion fabricated from the "loop" material forming part of a VELCRO® strip, and a second securing portion 66 fabricated from the "hook" material forming the remaining part of a VELCRO® strip. The components used to secure the device 10 to the tank portion of the motorcycle can include a myriad of components normally used for attaching items, but VELCRO® not only provides the securing strength required, but because of its inherently soft characteristics, prevents scratching to the surface of the tank portion of the motorcycle that receives the second portion 66 of the securing member 18.

The first securing portion 64 is formed from three identical, independent "loop" VELCRO® strips inserted through the securing aperture 32 such that each end of each strip protrudes from the securing aperture 32 a length sufficient to bend each strip around the second side wall 26 of the receiving member 12, and congruently join, via glue or similar methods, each respective pair of strip ends together thereby providing a rectangular, planar surface that ultimately attaches to the second securing portion 66 to secure the device 10 to the tank portion of the motorcycle.

Figure 8:
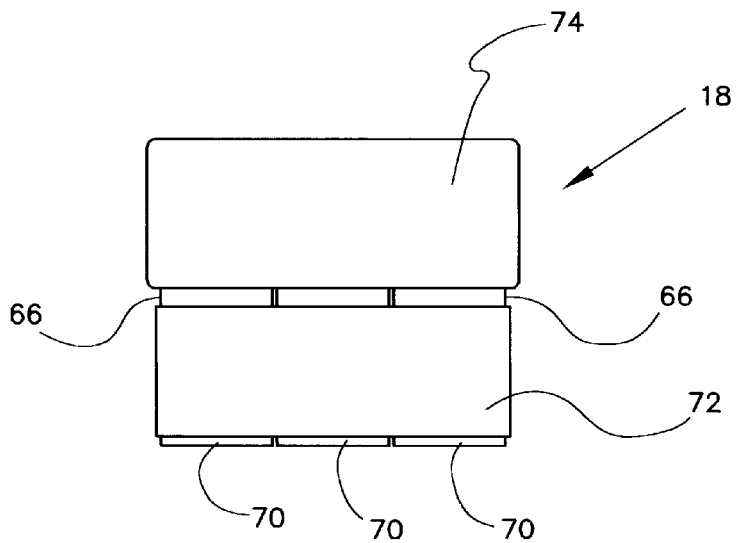
FIG. 8 is a bottom elevation view of a second securing portion of a securing member.
Figure 9:
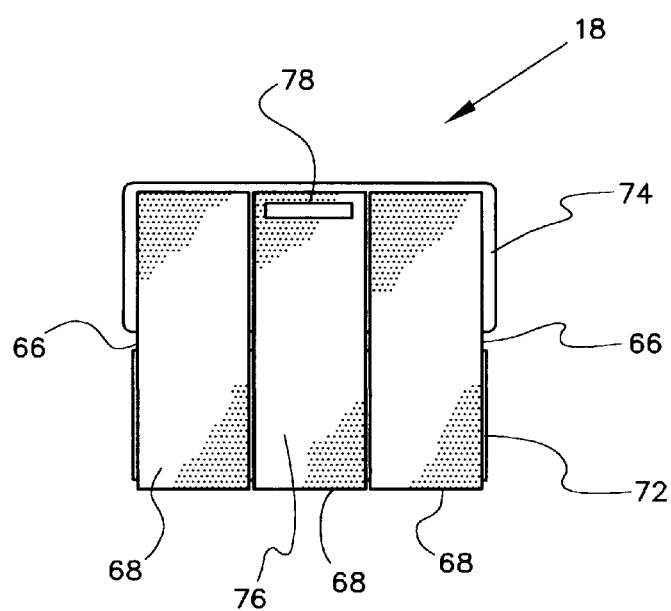
FIG. 9 is a top elevation view of the second securing portion of the securing member.

Referring to FIGS. 8 and 9, the second securing portion 66 is formed from three identical, independent VELCRO® strips having top walls 68 that include a "hook" material, and planar bottom walls 70 that include a permanent adhesive spread thereupon. A removable paper piece 72 is secured to substantially one-half of the surface area of each of the adjacently positioned strips. A light weight metal plate 74 is permanently secured to and positioned upon the remaining half of the surface area of the aligned strips. Removing the paper piece 72 allows all three strips of the second securing portion 66 to be permanently attached to a preselected part of the tank portion of the motorcycle. The metal plate 74 allows all three strips to be folded simultaneously such that the "hook" portions of each respective half of each strip are forcibly engaged to retain the second securing portion 66 in a "closed" position that prevents dirt from accumulating upon an otherwise exposed or "open" second securing portion 66. Although the engaging "hook" portions of each respective half of each strip will have some "holding"capability, the vibrations generated by a moving motorcycle may force the folded strips to shake free and oscillate. To provide more "holding" force, a small section of the middle strip 76 includes a "loop" portion 78 that maintains the metal strip in the closed position irrespective of motorcycle vibration or the condition of the road the motorcycle is moving upon. Although the engaging hook portions of each respective half of each strip will have some "holding" capability, the vibrations generated by a moving motorcycle may force the folded strip to shake free and "flap." To provide more holding force, a small section of the middle strip 76 includes a loop portion 78 that maintains the metal strip 74 in the closed position irrespective of motorcycle vibration or the condition of the road that the motorcycle is moving upon. The three independent strips of each of the first and second securing portions 66 and 68 allows the container receiving holder 12 to be removed with a relatively small amount of force from the motorcycle by "peeling" independently, each of the three first securing portions 64 from a corresponding second securing portion 66.

In operation, the device 10 is positioned toward the back portion of the top surface area of the fuel tank of a motorcycle. The motorcycle tanks have a relatively "steep" incline with a high point near the handle bars. An individual operating the motorcycle will select a location for the device 10 that allows the individual to comfortably reach a beverage can or other container held by the device 10 when the motorcycle is moving. After selecting the best location for the device 10, the second securing portion 66 is pulled apart from the first securing portion 64. The paper piece 72 is then removed from the bottom walls 70 of the second securing portion 66, allowing the bottom walls 70 to be permanently attached to the preselected portion of the motorcycle tank. The container holder 12 receives positioning member 14 by forcibly separating the end portions 40 a distance sufficient to allow the end portion to be forcibly inserted into the recesses 34 in the holder 12. Although the end portions 40 snugly fit into the recesses 34, the positioning member 14 is capable of pivoting around the first side wall 24 of the holder. The stabilizing member 16 is then secured to the positioning member 14 by placing a second portion 54 of the wrap member 44 on top of a base member 38 of the positioning member 14 (see FIG. 6), then placing two side members 36 of the positioning member 14 on top of a first portion 48 of the wrap member 44. The VELCRO® portions 50 at respective ends of the first portion 48 of the wrap member 44 are folded around the side members 36 and secured to corresponding VELCRO® portions 52 at the midsection of the first portion 48. The first securing portion 64 is integrally joined to the stretch member 46, which is in turn integrally joined to an edge portion of the second portion 54 of the wrap member 44. A section of the first securing portion 64 is then engaged with a first section of the second securing portion 66 to secure the second side wall 26 of the device 10 to the motorcycle. The positioning member 14 is then pivoted opposite to the second side wall 26 of the device 10, thereby forcibly stretching the stretch member 46 and, with the aid of the offset portions 42, placing the top wall 20 of the container receiving member 12 in a substantially horizontal position thus allowing the receiving member 12 to "lock-in" or maintain the received container in a substantially vertical position.

Once the container is inserted through the aperture 30 in the receiving member 12, the rubber upper and lower surfaces 58 and 56, positioned between the top of the motorcycle tank and the bottom of the container, have a gripping tendency that is amplified by the weight of the container to substantially maintain the relative position of the device 10 engaging the tank portion of the motorcycle thereby stabilizing the lower portion of the container. Further, the receiving member aperture 30 is dimensioned to snugly receive the container, and the positioning member side members 36 are dimensioned to position the receiving member 12 to engage an upper portion of the container thus securing the relative position of the upper portion of the container.

When the container is removed from the device 10, the device may be folded or collapsed from an elevated position to a folded position (see FIGS. 4 and 5) by urging the second portion 54 of the wrap member 44 toward the second lateral side wall 26 of the receiving member 12 which in turn forces the base member 38 of the positioning member 14 toward the bottom wall 22 of the receiving member 12. Also, rather than folding the device 10, the receiving member 12 and all attached components may be separated from the second securing portion 66 of the securing member 18, by lifting the metal strip 74 from the first securing portion 64 of the securing member 18, and "peeling" away each of the three VELCRO® strips forming the first securing portion 64, from the corresponding three VELCRO® strips forming the second securing portion 66. The metal strip is then repositioned such that corresponding halves of the top walls 68 of the second securing portion 66 are forcibly engaged to effectively cover and protect the VELCRO® portions from the elements. The remaining components of the device 10 are then safely stored until needed.

The foregoing description is for purposes of illustration only and is not intended to limit the scope of protection accorded this invention. The scope of protection is to be measured by the following claims, which should be interpreted as broadly as the inventive contribution permits.

What is claimed is:

1. A food and beverage container holder device for motorcycles comprising:

a rigid receiving member having securing and container receiving apertures therethrough, said container receiving aperture being positioned adjacent to a first lateral side wall of said receiving member, said securing aperture being positioned adjacent to a second lateral side wall of said receiving member, said receiving member having opposing recesses in opposite longitudinal side walls, said recesses being positioned adjacent to said first lateral side wall of said receiving member;

first securing portion joined to said receiving member via said securing aperture;

a second securing portion adapted to be joined to the motorcycle;

means for removably joining said first securing portion to said second securing portion;

means for positioning said holder device upon an inclined surface, said means for positioning associated with said recesses; and means for stabilizing said holder device and the received container when said holder device is removably secured to the motorcycle.

2. The device of claim 1 wherein said joining means includes cooperating hook and loop members comprising portions of said first and second securing portions.

3. The device of claim 1 wherein said positioning means includes a positioning member adjustably joined to said receiving member via said opposing recesses in said longitudinal side walls of said receiving member, said positioning member being forcible inserted into said opposing recesses thereby allowing said positioning member to pivot around an axis being substantially parallel and adjacent to said first lateral side wall of said receiving member.

4. The device of claim 3 wherein said positioning member includes a square configured, substantially rigid bar having one open side forming two opposing end portions extending convergingly to a distance of separation relatively shorter than the distance separating the first and second lateral side walls of the receiving member, said opposing end portions having longitudinal dimensions substantially equal to the longitudinal dimension of said opposing recesses in said first and second lateral side walls of said receiving member.

5. The device of claim 1 wherein said stabilizing means includes a wrap member removably secured to said positioning means, and a resilient stretch member joined to said wrap member and said first securing portion.

6. The device of claim 5 wherein said wrap member includes a first portion removably secured to opposing side members of said positioning means, and a second portion engaging a base member of said positioning means such that when said second portion is urged toward said second lateral side wall of said receiving member, said second portion correspondingly urges said base member of said positioning means toward a bottom wall of said receiving member.

7. The device of claim 6 wherein said second member of said wrap member includes upper and lower planar surfaces having means for maintaining the relative position of said lower surface in relation to the engaged portion of the motorcycle, and said upper surface in relation to the engaged portion of the container.

8. The device of claim 7 wherein an edge portion of said second portion of said wrap member is joined to a first end of said stretch member, a second end of said stretch member is joined to said first securing portion, said base member of said positioning means is orientated such that a top wall of said receiving member is positioned substantially horizontal to elongate said stretch member and to allow said receiving member to receive said container, said second portion of said wrap member having top and bottom gripping surfaces that engage corresponding bottom and top portions of the container and motorcycle, thereby stabilizing the relative position of said food and beverage container holder device in relation to the motorcycle.

9. The device of claim 2 wherein said hook and loop members are divided into a plurality of sections to reduce the force required to separate said hook and loop members when removing said container holder device from the motorcycle.

10. The device of claim 1 wherein said second securing portion has a first section securable to the motorcycle tank portion to allow a second section of said second securing portion to be folded such that said first and second sections are forcibly engaged thereby retaining said second securing portion in a closed position after said container receiving member is removed from the motorcycle.

11. The device of claim 10 wherein said second section of said second securing portion includes a relatively small loop portion that engages a corresponding hook portion of said first section of said second securing portion to provide increased holding force to maintain said second securing portion in a closed position.

12. A device for maintaining the position of a container set upon a tank portion of a motorcycle comprising:

a container receiving member having container and securing apertures positioned at opposite portions of said receiving member, said container receiving member including opposing recesses positioned adjacent to said container aperture;

a first securing portion joined to said container receiving member via said securing aperture;

a second securing portion adapted to be joined to the tank portion of the motorcycle;

means for joining said first securing portion to said second securing portion;

means for positioning said device upon the tank portion of the motorcycle said means for positioning associated with said recesses; and means for stabilizing said device and the received container when the device is removably secured to the tank portion of the motorcycle.

13. A collapsible container holding device positioned upon a tank portion of a motorcycle comprising:

a container receiving member having container and securing apertures positioned at opposite portions of said receiving member, said container receiving member including opposing recesses positioned adjacent to said container aperture;

a first securing portion joined to said container receiving member via said securing aperture;

a second securing portion adapted to be joined to the tank portion of the motorcycle;

means for removably joining said first securing portion to said second securing portion;

means for stabilizing said container receiving member and the received container and means for folding said device between use and non-use positions, said means for folding associated with said recesses.

* * * * *